US008402191B2

(12) United States Patent
Godwin et al.

(10) Patent No.: US 8,402,191 B2
(45) Date of Patent: Mar. 19, 2013

(54) COMPUTING ELEMENT VIRTUALIZATION

(75) Inventors: Kurt Godwin, Longmont, CO (US); Shaun McMaster, Broomfield, CO (US)

(73) Assignee: STMicroelectronics, Inc., Coppell, TX (US)

( * ) Notice: Subject to any disclaimer, the term of this patent is extended or adjusted under 35 U.S.C. 154(b) by 166 days.

(21) Appl. No.: 12/982,506

(22) Filed: Dec. 30, 2010

(65) Prior Publication Data
US 2012/0173788 A1 Jul. 5, 2012

(51) Int. Cl.
*G06F 13/24* (2006.01)
(52) U.S. Cl. ........................................ 710/261; 711/173
(58) Field of Classification Search .................. 710/261, 710/260, 263–267; 718/1, 100–104, 107–108; 711/173, 163
See application file for complete search history.

(56) References Cited

U.S. PATENT DOCUMENTS

| 6,892,383 | B1 | 5/2005 | Arndt | |
|---|---|---|---|---|
| 8,041,987 | B2 * | 10/2011 | Allen et al. | 714/5.11 |
| 2010/0229173 | A1 * | 9/2010 | Subrahmanyam et al. | 718/103 |
| 2011/0022788 | A1 * | 1/2011 | Karamcheti et al. | 711/103 |

OTHER PUBLICATIONS

"Quick Migration with Hyper-V," White Paper, Microsoft, Windows Server 2008, Jan. 2008, pp. 1-25.
Adams, K., et al., "A Comparison of Software and Hardware Techniques for x86 Virtualization," Architectural Support for Programming Languages and Operating Systems, San Jose, CA, Oct. 21-25, 2006, 12 pgs.
Humphreys, J., "Sun Microsystems' Solutions for Virtualization Across the Enterprise," White Paper, IDC, Aug. 2007, pp. 1-14.

* cited by examiner

*Primary Examiner* — Clifford Knoll
(74) *Attorney, Agent, or Firm* — Slater & Matsil, L.L.P.

(57) ABSTRACT

System and method for virtualization of computing elements. A hypervisor provides virtualization of one or more peripherals for one or more computing elements. The hypervisor may further allow separate instances of an operating system to be suspended on one computing element to allow another application to be processed by replacing the state information of the computing element. The suspended instance may be resumed on the same or a different computing element.

19 Claims, 3 Drawing Sheets

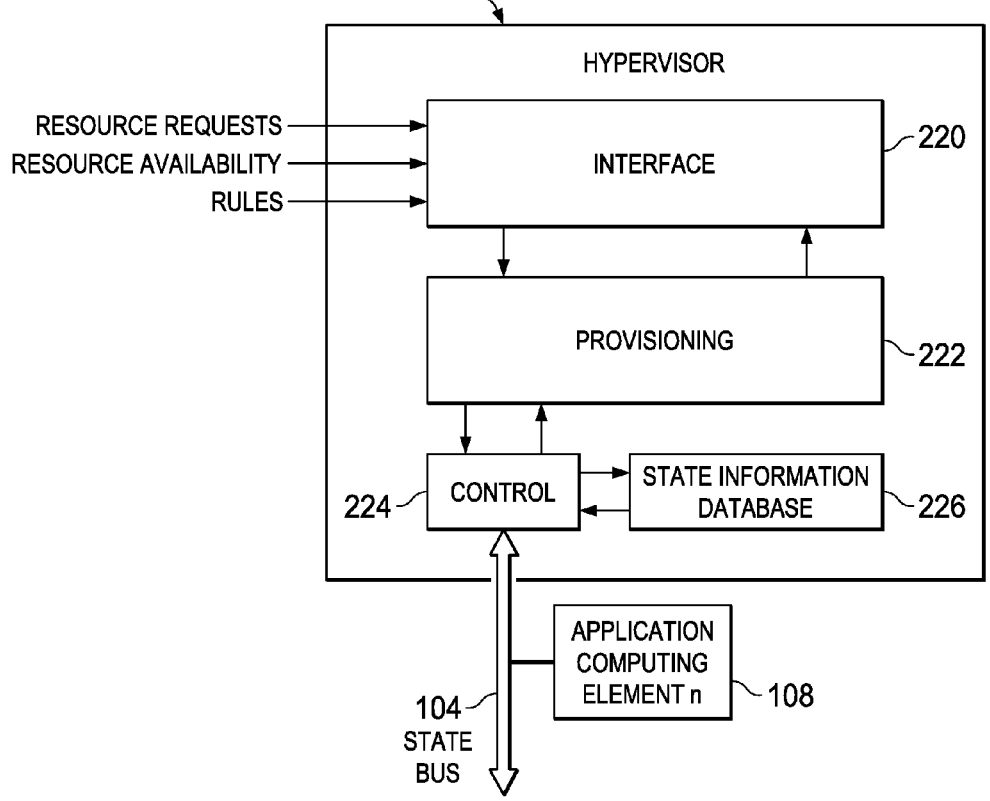
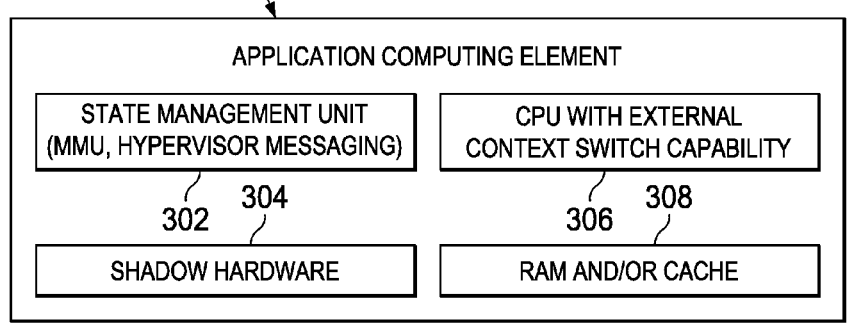

COMPUTING ELEMENT VIRTUALIZATION

TECHNICAL FIELD

The present disclosure relates generally to computer architectures and, more particularly, to virtualization of computing element resources.

BACKGROUND

Applications are executed by a processor whose execution is controlled by an operating system. The operating system interfaces directly with the hardware components of the processor and the hardware components coupled to the processor. In this configuration, if another operating system, such as another instance of an operating system, is needed, another processor and hardware components would be added to the configuration.

In an attempt to reduce the costs, particularly hardware costs, some systems employ virtualization techniques by sharing the hardware with multiple instances of an operating system. In one such system, provides a host operating system that runs multiple instances of child operating systems with which user programs interface. Virtualization is performed by a host process, referred to as a hypervisor, and utilizes a significant amount of system support and software emulation of hardware. The hypervisor is largely written for a specific operating system and utilizes limited hardware support for virtualization, but allows multiple instances of child operating systems to share a single processor and virtualized hardware resources. The hypervisor may also isolate the applications from one another, such that a failure in one application does not necessary cause a failure in the other applications or the hardware platform. In this type of system, the hypervisor is a software module that interfaces between the operating system and the hardware, e.g., the processor.

In some implementations, the system is based on a group of central processing units (CPUs) that operate in a symmetric multi-processing environment. In these implementations, a software module exists on each CPU that acts as an interface between the operating system and the respective hardware elements. These implementations provide a symmetric multi-processing environment.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 2 is a functional block diagram of the hypervisor in accordance with an embodiment;

FIG. 3 is a functional block diagram of an application computing element in accordance with an embodiment;

DETAILED DESCRIPTION OF ILLUSTRATIVE EMBODIMENTS

The making and using of illustrative embodiments are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Figure 1:
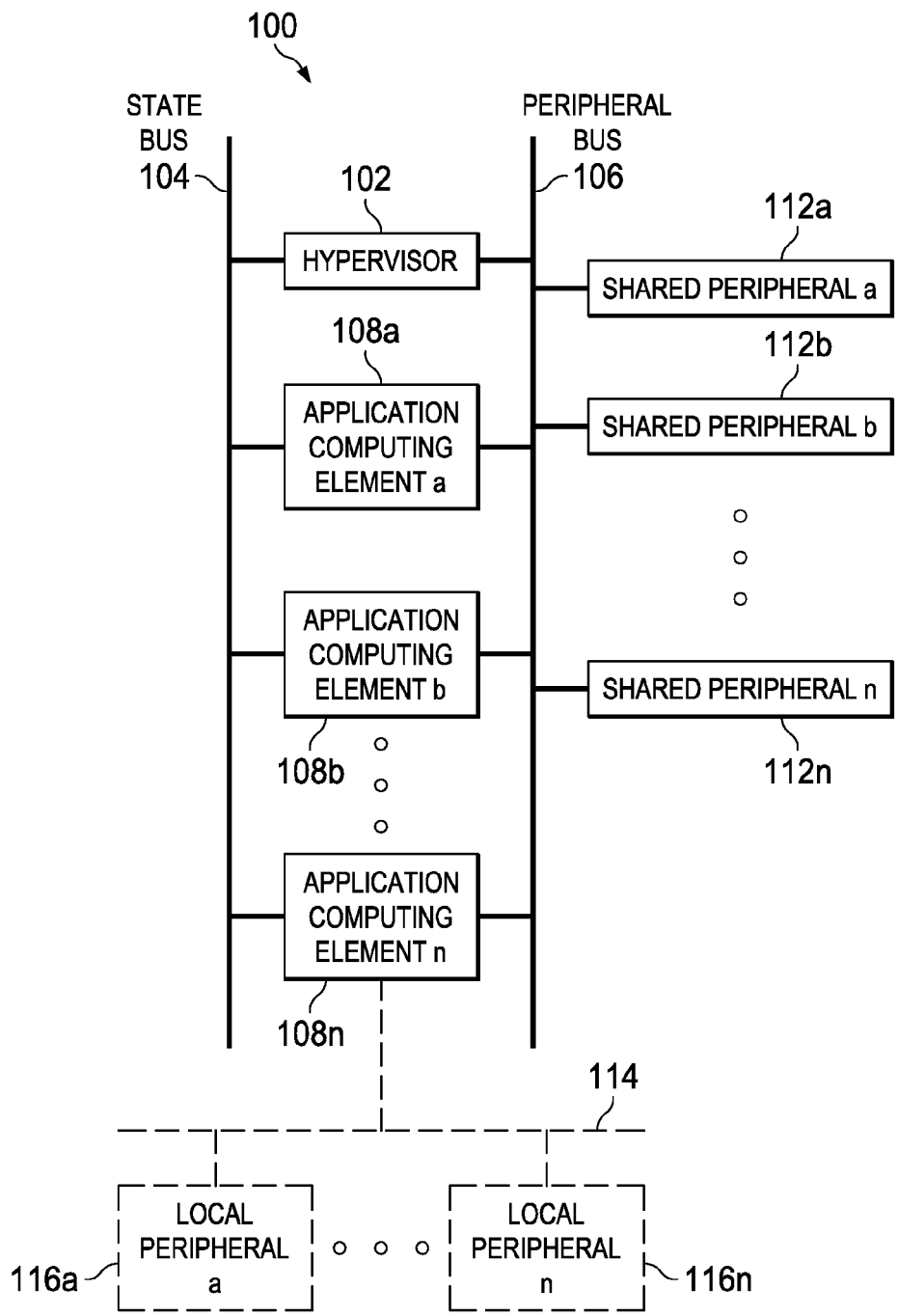
FIG. 1 illustrates a high-level computer architecture in accordance with an embodiment.

FIG. 1 illustrates a computing system 100 in accordance with an embodiment. A hypervisor 102 is communicatively coupled to a state bus 104. Optionally, the hypervisor 102 may also communicatively couple to a peripheral bus 106. FIG. 1 further illustrates that one or more computing elements 108a-108n (collectively referred to as computing elements 108) are also communicatively coupled to the state bus 104 and the peripheral bus 110. Each computing element 108 may be a single central processing unit (CPU), a plurality of processing cores of a multi-core processor, a single core of a multi-core processor, and/or the like. It should also be noted that the computing elements 108 may include different types of processing elements.

The peripheral bus 110 provides access to common peripherals, indicated by shared peripherals 112a-n (collectively referred to as shared peripherals 112). The shared peripherals 112 are accessible by any of the computing elements 108 via the peripheral bus 106, wherein the shared peripherals 112 may represent any suitable device or component. For example, the shared peripherals 112 may include memory, hard disks, printers, displays, network elements, and/or the like. It should be noted that the shared peripherals 112 themselves may be virtual devices.

It should also be noted that access to the shared peripherals 112 may be limited or controlled by the hypervisor 102. For example, as discussed in greater detail below, the hypervisor 102 provides status information to the individual computing elements 108, and part of that status information includes a definition of the shared peripherals 112 accessible by each specific computing elements 108. In this manner, the hypervisor 102 can control to which peripheral each specific computing element 110 has access. Moreover, the shared peripherals 112 to which a specific computing element 108 has access may be controlled dynamically, such that one of the computing element 108 may have access to a particular shared peripheral at one point, but after being dynamically reconfigured by the hypervisor 102 to perform a different task no longer has access to that particular shared peripheral. Such a capability provides embodiments in which the computing elements 108 may be dynamically reconfigured, including allocating/reallocating subsets of computing elements 108 in a symmetrical and/or asymmetrical multi-processor environment.

As illustrated in FIG. 1, the hypervisor 102 and/or the computing elements 108 may each have a local bus 114, thereby communicatively coupling the computing elements 108 to its respective local peripherals 116a-n (collectively referred to as local peripherals 116). The local peripherals 116 may provide local and exclusive access to certain peripherals, including memory, storage, specialized processing units (e.g., graphics processing units, etc.), and/or the like.

The state bus 104 and the peripheral bus 106 are illustrated in FIG. 1 as two separate distinct buses for illustrative purposes only and may be implemented in any number of ways. For example, the state bus 104 and the peripheral bus 106 may be implemented on a single bus. The single bus may be logically divided into a single bus, or alternatively, be represented by a various commands on the single bus. It may be desirable, however, to implement the state bus 104 such that the computing elements 108 have limited control, thereby preventing an operating system on one computing element 108 from gaining control or corrupting another operating system on a different computing element 108.

In operation, the hypervisor 102 communicates state information to the computing elements 108. The state information provides the context information, status information, and hardware information necessary for the computing elements 108 to perform a specific task and may include a program counter, hardware (e.g., peripherals) definitions, memory maps, register contents, and/or the like. Based upon system requirements and/or status of the computing elements 108, the hypervisor 102 may dynamically reallocate one or more of the computing elements 108 by retrieving or receiving the status information of the computing element 108 and providing status information corresponding to a different task to be performed. The hypervisor 102 may store the previous state information retrieved from the computing element to resume the task on the same or a different computing element.

FIG. 2 is a functional block diagram of the hypervisor 102 in accordance with an embodiment. The hypervisor 102 includes an interface component 220, a provisioning component 222 and a control component 224. The interface component 220 provides an interface by which a user, e.g., a system administrator, may configure the system, check status/usage data, and the like. In an embodiment, the interface component 220 provides a web-type interface for the user. Data received by the interface component 220 may include resource requests, resource availability, and rules.

Generally, the provisioning component 222 analyzes resource requests and resource availability to determine which computing elements 108 are to perform which tasks. The resource requests represent the operating systems that the computing system 100 is to execute and may include, for example, an operating system and the peripheral resource requirements of the operating system. The operating system may be, for example, an instance of an operating system, and the peripheral resource requirements may be, for example, processing requirements, the type and/or amount of peripherals required by the operating system, such as the amount of memory, disk storage, Ethernet/broadband resources, video devices, wireless capabilities, and/or the like. Also included may be an indication of the criticality and/or priority of the particular instance of the operating system. In some situations, an instance of an operating system to be used for background tasks. In these situations, the provisioning component 222 may assign the particular instance of the operating system a lower priority or a less powerful computing element. In other situations, however, an instance of an operating system to be used for service-related, time-critical applications. In these situations, the provisioning component 222 may assign the particular instance of the operating system to a powerful computing element 108 and/or set the priority level high such that the provisioning component 222 may preempt lower priority applications to perform a higher priority application.

The resource availability represents the resources that are currently available and may be assigned to perform one or more of the resource requests. The resource availability may include, for example, a hardware definition (e.g., processing power), local resource availability, and/or the like.

Also considered by the provisioning component 222 are any rules defined by a user (e.g., a system administrator). The rules may indicate how often operating system may be swapped, rules restricting a subset of the computing elements for specific types of applications (e.g., restricting certain ones of the computing elements to high priority applications), and/or the like.

Based upon the resource request, the resource availability, and the rules, the provisioning component 222 determines which operating systems, if any, are to be swapped and when the operating systems are to be swapped. Upon reaching the determination, the provisioning component provides to the control component 224 instructions to swap one operating system on a particular computing element with another operating system. It should be noted that the instructions may include a time at which to perform the swap such that the provisioning component 222 schedules the swaps in advance.

The control component 224 maintains a state information database 226, in which the control component 224 stores the state information for operating systems not currently being executed by one or more of the computing elements 108, e.g., operating systems waiting to be swapped into an computing element 108. The state information database 226 may be stored in local storage or on a shared peripheral.

FIG. 3 is a functional block diagram of an computing element 108 in accordance with an embodiment. The computing element 108 may include a state management unit 302, a shadow hardware unit 304, a context switch unit 306, and RAM/cache unit 308. The state management unit 302 is the primary interface between the computing element 108 and the hypervisor 102. As such, the state management unit 302 is responsible for receiving messages from and transmitting messages to the hypervisor 102 regarding control and status. The state management unit 302 may also include a memory management unit (MMU) to provide translation services between the various instances of an operating system that may be executed by each particular computing element 108.

For example, as noted above, the state information provided to the computing elements 108 may also include a memory map, wherein the memory allocated at that time to the specific computing element 108 is provided. When an operating system attempts to access a specific memory location, the memory management unit of the state management unit 302 may provide translation services between the addresses used by the operating system and the computing element 108 to physical addresses of the shared peripherals 112. As an example, the particular instance of the operating system may be assigned by the hypervisor 102 a block of memory whose physical addresses in the computing system 100 does not correspond to the logical addresses used by the operating system. In these instances, the memory management unit translates between the logical addresses and the physical addresses. It should be noted that the memory management unit may provide access to actual, physical hardware devices as well as simulated hardware devices. For example, an operating system executing on a computing unit may be presented with a disk drive, which may correspond to a physical disk drive or a portion of RAM simulating a disk drive.

The shadow hardware unit 304 provides an interface to the virtualized hardware devices, which may be implemented as a series of registers that, to the operating system being performed by the computing element, appears as the actual hardware components, such as network devices/interfaces, disk drives, monitors, and the like. Access of the shadow hardware unit 304 may, in some situations, generate events that may be filled by the state management unit 302 and/or the shadow hardware unit 304 of the computing element 108 and/or by the hypervisor 102.

In an embodiment, the shadow hardware unit 304 may be implemented as described in U.S. patent application Ser. No. 12/976,187, entitled "Computer Architecture Using Shadow Hardware," filed on Dec. 22, 2010, which is incorporated herein by reference. Generally, the shadow hardware unit 304 utilizes shadow registers to interface between a host, such as the computing elements 108, and actual hardware devices, such that the target device to which the host believes it is communicating may be a different device, a different type of device, a portion of the device than the actual device, or the same as the actual device. The shadow system intercepts requests issued by the host and redirects the requests to shadow registers. The shadow registers are modified as necessary to interface with the actual device. A controller interacts with the actual devices using the shadow registers as required for a specific configuration. Other implementations may also be used. Furthermore, the shadow registers contain state information that can be switched out as requested by the hypervisor. To decrease the overhead of switching state, some implementations may utilize two or more copies of the shadow hardware registers and switching state requires only selection of the active register set.

The RAM and/or cache 308 provides memory specific to the computing element. Because the RAM and/or cache 308 stores temporary values that may be used by the application, it is typically desirable that the contents the RAM and/or cache 308 be included in the state information provided to and from the hypervisor 102.

Embodiments such as those disclosed herein provide a system in which physical hardware devices may be shared by multiple operating systems in an environment wherein the different ones of the multiple operating systems are unaware of each other. This functionality is provided, at least in part, by the hypervisor and the use of the shadow hardware components of the various computing elements. At the same time, the hypervisor and the shadow hardware component may be configured to share data between operating systems (e.g., a common disk with read-only data), whether those operating systems are performed by the same or different computing elements.

Figure 4:
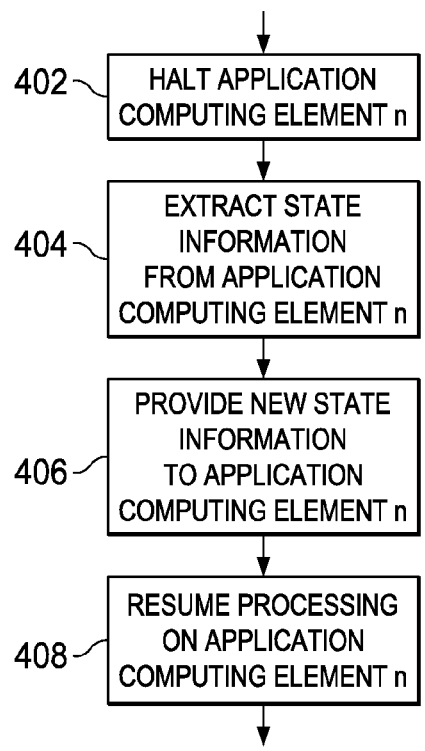
FIG. 4 is a flow chart illustrating a process performed by a control component of a hypervisor in accordance with an embodiment.

FIG. 4 is a flow chart illustrating a process performed by the control component in accordance with an embodiment. The process begins at step 402, wherein an computing element 108 is halted. After halting the computing element 108, the state information is extracted from the computing element and stored by the control component 224 of the hypervisor 102 to resume the operating system on the same or different computing element 108 at a later time, in step 404. The state information may be retrieved by the hypervisor 102. The computing element 108 may automatically transmit the state information in response to the halt command, or any other suitable method.

Alternatively, the computing elements may provide a high speed swap capability. It is expected that in some implementations, the amount of state information is great enough such that transferring the state information between the computing element and the hypervisor would be a time consuming process. In these implementations, it may be desirable to provide a high-speed swap capability wherein the state information is stored locally by each computing element. In these implementations, the hypervisor instructs or otherwise provides the computing element an indication of which operating systems to swap. The computing element would store the state information locally and be able to swap state information at a much higher rate than transferring the state information via the state bus.

In another alternative, the computing element 108 may be prepared for switching operating systems in parallel to performing another operating system. In this embodiment, the state information for one instance of an operating system is transferred to the computing element while the computing element is performing another instance of an operating system. In this manner, the hypervisor is still able to switch operating systems between computing elements while still taking advantage of a high speed internal swap of the state information by the computing element.

Another application of this design would be to create a System On a Chip (SOC) or computing hardware that emulates completely the aspects of a range of other computing hardware. This allows the application targeted for a specific SOC to run on a completely different SOC by including a hypervisor component and shadow hardware that translates hardware presented by the virtual system in to actual hardware access translated by the hypervisor. This also allows future SOC's based on the hypervisor to provide backward compatibility by emulating older versions of the same SOC.

The processing proceeds to step 406, wherein the computing element 108 is provided with state information corresponding to an operating system to be resumed or initiated. As discussed above, the state information includes data such as the program counter, register values, logical memory map, hardware configurations, and/or the like necessary for the computing element to resume processing. Once the state information is updated, the computing element 108 may resume processing, as indicated in step 410.

In this manner, the hypervisor 102 dynamically reallocates the computing elements 108 based upon the needs of the various instances of operating systems. This level of virtualization allows multiprocessor systems to be configured and reconfigured, including configuring and reconfiguring computing elements 108 to operate in symmetrical and asymmetrical modes with respect to the operating system currently assigned to more than one computing element.

Figure 5:
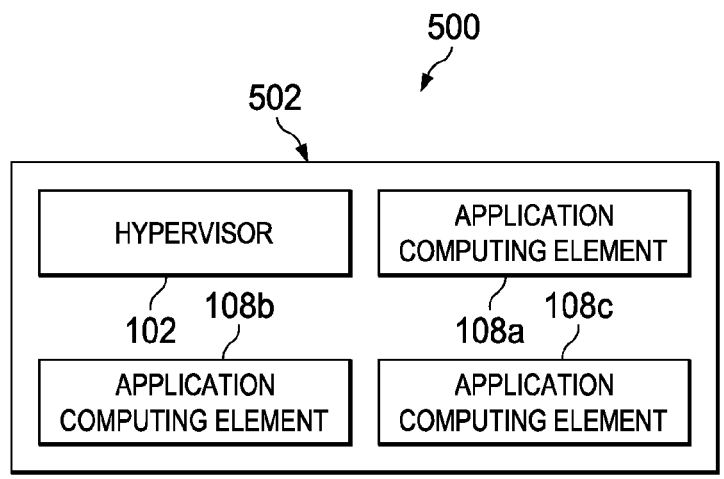
FIG. 5 illustrates another computer architecture having a hypervisor in accordance with an embodiment.

FIG. 5 illustrates another computing system 500 having a hypervisor 102 in accordance with an embodiment. As noted above, the computing system 100 illustrated in FIG. 1 may take many different forms and FIG. 1 illustrates an embodiment in which each computing element 108 is a separate central processing unit. FIG. 5 illustrates an embodiment in which the computing elements 108 and the hypervisor 102 are implemented on a single chip 502, such as a quad-core processor chip. In this embodiment, the hypervisor 102 and the individual computing elements 108 are individual cores of the single chip.

While this detailed description has set forth some embodiment of the present invention, the appended claims cover other embodiments of the present invention which differ from the described embodiments according to various modifications and improvements. For example, the state information may include more or less data, the computing elements themselves may be a virtual computing environment, and/or the like.

Within the appended claims, unless the specific term "means for" or "step for" is used within a given claim, it is not intended that the claim be interpreted under 35 U.S.C. 112, paragraph 6.

What is claimed is:
1. A system comprising:
a state bus;
a peripheral bus;
a computing element being communicatively coupled to the state bus and the peripheral bus; and
a hypervisor communicatively coupled to the state bus, the hypervisor receiving processing tasks and dynamically providing state information to the computing element such that processing tasks performed by the computing element may be switched, the hypervisor controlling access by the computing element to peripherals on the peripheral bus based on the processing task performed by the computing element.

2. The system of claim 1, wherein the computing element includes shadow hardware.

3. The system of claim 1, wherein the state bus and peripheral bus are logical buses of a single physical bus.

4. The system of claim 1, wherein the computing element comprises one core of a plurality of processing cores of a multi-core processor chip.

5. The system of claim 4, wherein another processing core of the multi-core processor chip acts as the hypervisor.

6. The system of claim 1, wherein the computing element comprises a central processing unit.

7. The system of claim 6, wherein another central processing unit acts as the hypervisor.

8. A system comprising:
a bus;
a first processing unit communicatively coupled with the bus;
a plurality of peripheral components communicatively coupled with the bus; and
a hypervisor processing unit and shadow hardware communicatively coupled with the bus, the hypervisor processing unit and the shadow hardware emulating one or more of the plurality of peripheral components as one or more shadowed components, the hypervisor processing unit controlling access by the first processing unit to the peripheral components and the shadow hardware based on a processing task performed by the first processing unit.

9. The system of claim 8, wherein the shadow hardware emulates a single physical component as a plurality of shadowed components.

10. The system of claim 8, wherein the hypervisor relocates data associated with one or more of the shadowed components.

11. The system of claim 8, wherein a first peripheral component emulates a first shadowed component, the first peripheral component being different than the first shadowed component.

12. The system of claim 8, further comprising a second processing unit, the first processing unit and a second processing unit share one or more of the plurality of peripheral components.

13. The system of claim 8, wherein the first processing unit performs a plurality of independent operating systems.

14. A method of controlling a multi-tasking processor system, the method comprising:
designating one of a plurality of computing elements as a hypervisor;
designating other ones of the plurality of computing elements as user computing elements;
determining, after designating user computing elements, a first computing element to which to assign a second instance of a second operating system, the first computing element determined based on at least resource requirements of the second instance of the second operating system;
receiving, by the hypervisor, first state information from the first computing element, the first state information corresponding to state information of a first instance of a first operating system; and
providing, by the hypervisor, second state information to the first computing element, the second state information corresponding to state information of the second instance of the second operating system.

15. The method of claim 14, wherein the second state information was received by the hypervisor from a second computing element, the first computing element being a different computing element from the second computing element.

16. The method of claim 14, wherein the first and second state information is provided via a state bus, the state bus being a separate bus from a peripheral bus coupling the first computing element and the second computing element to one or more peripherals.

17. The method of claim 14, wherein the second state information comprises shadow hardware state information, the shadow hardware state information comprising information associated with one or more peripherals to which the second instance of the second operating system is allowed access.

18. The method of claim 17, wherein at least one of the peripherals is a shadowed component, the shadowed component comprising a first peripheral being emulated as a second peripheral.

19. The method of claim 17, wherein the second instance of the second operating system is allowed access to only a subset of peripherals communicatively coupled to the first computing element.

* * * * *